(12) United States Patent
Mayya et al.

(10) Patent No.: US 10,574,528 B2
(45) Date of Patent: Feb. 25, 2020

(54) NETWORK MULTI-SOURCE INBOUND QUALITY OF SERVICE METHODS AND SYSTEMS

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Mukamala Swaminathan Srihari, Chennai (IN)

(73) Assignee: NICIRA, INC., Palo Alto, CA (US)

(*) Notice: Subject to any disclaimer, the term of this patent is extended or adjusted under 35 U.S.C. 154(b) by 0 days.

(21) Appl. No.: 15/811,329

(22) Filed: Nov. 13, 2017

(65) Prior Publication Data
US 2018/0302286 A1    Oct. 18, 2018

Related U.S. Application Data

(60) Provisional application No. 62/457,816, filed on Feb. 11, 2017.

(51) Int. Cl.
*H04L 12/24* (2006.01)
*H04L 12/26* (2006.01)

(52) U.S. Cl.
CPC ...... *H04L 41/0896* (2013.01); *H04L 43/0876* (2013.01)

(58) Field of Classification Search
CPC ......... H04L 47/20; H04L 43/00; H04L 43/08; H04L 43/0876; H04L 47/72; H04L 47/80; H04L 47/78

USPC .......................................................... 709/224
See application file for complete search history.

(56) References Cited

U.S. PATENT DOCUMENTS

| | | | |
|---|---|---|---|
| 7,003,481 B2 | 2/2006 | Banka et al. | |
| 8,111,692 B2 | 2/2012 | Ray | |
| 8,228,928 B2 | 7/2012 | Parandekar et al. | |
| 8,243,589 B1 | 8/2012 | Trost et al. | |
| 8,259,566 B2 * | 9/2012 | Chen | H04L 1/0002 370/230 |

(Continued)

FOREIGN PATENT DOCUMENTS

| | | |
|---|---|---|
| EP | 1912381 A1 | 4/2008 |
| EP | 3041178 A1 | 7/2016 |

(Continued)

OTHER PUBLICATIONS

Non-Published commonly Owned U.S. Appl. No. 15/701,115, filed Sep. 11, 2017, 21 pages, Nicira, Inc.

(Continued)

*Primary Examiner* — Mahran Y Abu Roumi
(74) *Attorney, Agent, or Firm* — Adeli LLP

(57) ABSTRACT

A computerized method useful for implementing a Multi-Source Inbound QoS (Quality of Service) process in a computer network includes the step of calculating a current usage rate of a provider entity. The provider entity is classified by a network traffic priority; implementing a fair sharing policy among a set of provider entities. The method includes the step of adjusting any excess bandwidth among a set of provider entities. The method includes the step of implementing link sharing at a provider-entity level.

16 Claims, 15 Drawing Sheets

(56) References Cited

U.S. PATENT DOCUMENTS

| | | |
|---|---|---|
| 8,566,452 B1 | 10/2013 | Goodwin et al. |
| 8,724,456 B1 | 5/2014 | Hong et al. |
| 8,964,548 B1 | 2/2015 | Keralapura et al. |
| 9,071,607 B2 | 6/2015 | Twitchell, Jr. |
| 9,154,327 B1 | 10/2015 | Marino et al. |
| 9,306,949 B1 | 4/2016 | Richard et al. |
| 9,336,040 B2 | 5/2016 | Dong et al. |
| 9,354,983 B1* | 5/2016 | Yenamandra ......... G06F 16/178 |
| 9,432,245 B1 | 8/2016 | Sorenson et al. |
| 9,450,817 B1 | 9/2016 | Bahadur et al. |
| 9,525,564 B2 | 12/2016 | Lee |
| 9,665,432 B2 | 5/2017 | Kruse et al. |
| 9,715,401 B2 | 7/2017 | Devine et al. |
| 9,722,815 B2 | 8/2017 | Mukundan et al. |
| 9,787,559 B1 | 10/2017 | Schroeder |
| 9,825,822 B1 | 11/2017 | Holland |
| 10,135,789 B2 | 11/2018 | Mayya et al. |
| 10,178,032 B1 | 1/2019 | Freitas |
| 10,187,289 B1 | 1/2019 | Chen et al. |
| 10,229,017 B1 | 3/2019 | Zou et al. |
| 10,326,830 B1 | 6/2019 | Singh |
| 10,348,767 B1 | 7/2019 | Lee et al. |
| 2002/0198840 A1 | 12/2002 | Banka et al. |
| 2003/0112808 A1 | 6/2003 | Solomon |
| 2003/0161313 A1 | 8/2003 | Jinmei et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2005/0078690 A1 | 4/2005 | DeLangis |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0193247 A1 | 8/2006 | Naseh et al. |
| 2007/0064604 A1* | 3/2007 | Chen .................. H04L 1/0002 370/230 |
| 2007/0091794 A1 | 4/2007 | Filsfils et al. |
| 2007/0121486 A1 | 5/2007 | Guichard et al. |
| 2007/0177511 A1 | 8/2007 | Das et al. |
| 2007/0260746 A1 | 11/2007 | Mirtorabi et al. |
| 2008/0049621 A1 | 2/2008 | McGuire et al. |
| 2008/0080509 A1 | 4/2008 | Khanna et al. |
| 2008/0095187 A1* | 4/2008 | Jung ................. H04L 41/0896 370/468 |
| 2008/0219276 A1 | 9/2008 | Shah |
| 2009/0154463 A1 | 6/2009 | Hines et al. |
| 2009/0247204 A1* | 10/2009 | Sennett ................ H04W 16/14 455/512 |
| 2010/0008361 A1 | 1/2010 | Guichard et al. |
| 2010/0118727 A1 | 5/2010 | Draves et al. |
| 2010/0332657 A1 | 12/2010 | Elyashev et al. |
| 2011/0075674 A1 | 3/2011 | Li et al. |
| 2011/0110370 A1 | 5/2011 | Moreno et al. |
| 2011/0153909 A1 | 6/2011 | Dong |
| 2012/0008630 A1 | 1/2012 | Ould-Brahim |
| 2012/0027013 A1 | 2/2012 | Napierala |
| 2012/0157068 A1 | 6/2012 | Eichen et al. |
| 2012/0173919 A1 | 7/2012 | Patel et al. |
| 2012/0221955 A1 | 8/2012 | Raleigh et al. |
| 2012/0250682 A1 | 10/2012 | Vincent et al. |
| 2012/0250686 A1 | 10/2012 | Vincent et al. |
| 2012/0300615 A1 | 11/2012 | Kempf et al. |
| 2012/0317291 A1 | 12/2012 | Wolfe |
| 2013/0019005 A1* | 1/2013 | Hui .................... H04L 43/0876 709/224 |
| 2013/0021968 A1 | 1/2013 | Reznik et al. |
| 2013/0044764 A1 | 2/2013 | Casado et al. |
| 2013/0051399 A1 | 2/2013 | Zhang et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0173788 A1 | 7/2013 | Song |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0283364 A1 | 10/2013 | Chang et al. |
| 2013/0301642 A1 | 11/2013 | Radhakrishnan et al. |
| 2013/0329548 A1 | 12/2013 | Nakil et al. |
| 2014/0019604 A1 | 1/2014 | Twitchell, Jr. |
| 2014/0108665 A1 | 4/2014 | Arora et al. |
| 2014/0156823 A1 | 6/2014 | Liu et al. |
| 2014/0173113 A1 | 6/2014 | Vemuri et al. |
| 2014/0219135 A1 | 8/2014 | Li et al. |
| 2014/0223507 A1 | 8/2014 | Xu |
| 2014/0244851 A1 | 8/2014 | Lee |
| 2014/0317440 A1 | 10/2014 | Biermayr et al. |
| 2015/0016249 A1* | 1/2015 | Mukundan ............ H04L 47/125 370/230 |
| 2015/0029864 A1* | 1/2015 | Raileanu ............... H04L 47/122 370/237 |
| 2015/0096011 A1 | 4/2015 | Watt |
| 2015/0188823 A1 | 7/2015 | Williams et al. |
| 2015/0222543 A1 | 8/2015 | Song |
| 2015/0236962 A1* | 8/2015 | Veres .................... H04L 47/225 370/230.1 |
| 2015/0334696 A1 | 11/2015 | Gu et al. |
| 2015/0350907 A1 | 12/2015 | Timariu et al. |
| 2015/0363733 A1 | 12/2015 | Brown |
| 2015/0372943 A1 | 12/2015 | Hasan et al. |
| 2016/0036924 A1 | 2/2016 | Koppolu et al. |
| 2016/0072669 A1 | 3/2016 | Saavedra |
| 2016/0142373 A1 | 5/2016 | Ossipov |
| 2016/0164914 A1 | 6/2016 | Madhav et al. |
| 2016/0173338 A1 | 6/2016 | Wolting |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0218947 A1 | 7/2016 | Hughes et al. |
| 2016/0315912 A1 | 10/2016 | Mayya et al. |
| 2016/0359738 A1 | 12/2016 | Sullenberger et al. |
| 2017/0012870 A1 | 1/2017 | Blair et al. |
| 2017/0026283 A1 | 1/2017 | Williams et al. |
| 2017/0034129 A1 | 2/2017 | Sawant et al. |
| 2017/0053258 A1 | 2/2017 | Carney et al. |
| 2017/0055131 A1 | 2/2017 | Kong et al. |
| 2017/0064005 A1 | 3/2017 | Lee |
| 2017/0123939 A1 | 5/2017 | Maheshwari et al. |
| 2017/0126564 A1 | 5/2017 | Mayya et al. |
| 2017/0134186 A1 | 5/2017 | Mukundan et al. |
| 2017/0201585 A1 | 7/2017 | Doraiswamy et al. |
| 2017/0207976 A1 | 7/2017 | Rovner et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257309 A1 | 9/2017 | Appanna |
| 2017/0279717 A1 | 9/2017 | Bethers et al. |
| 2017/0310691 A1 | 10/2017 | Vasseur et al. |
| 2017/0317974 A1 | 11/2017 | Masurekar et al. |
| 2017/0337086 A1 | 11/2017 | Zhu et al. |
| 2017/0339070 A1 | 11/2017 | Chang et al. |
| 2018/0014051 A1* | 1/2018 | Phillips ................... H04L 67/02 |
| 2018/0034668 A1 | 2/2018 | Mayya et al. |
| 2018/0041425 A1 | 2/2018 | Zhang |
| 2018/0074909 A1 | 3/2018 | Bishop et al. |
| 2018/0077081 A1* | 3/2018 | Lauer ...................... H04L 47/50 |
| 2018/0084081 A1 | 3/2018 | Kuchibhotla et al. |
| 2018/0176130 A1 | 6/2018 | Banerjee et al. |
| 2018/0234300 A1 | 8/2018 | Mayya et al. |
| 2018/0270104 A1 | 9/2018 | Zheng et al. |
| 2018/0278541 A1 | 9/2018 | Wu et al. |
| 2018/0295529 A1 | 10/2018 | Jen et al. |
| 2018/0375744 A1 | 12/2018 | Mayya et al. |
| 2018/0375824 A1 | 12/2018 | Mayya et al. |
| 2019/0028552 A1 | 1/2019 | Johnson et al. |
| 2019/0058709 A1 | 2/2019 | Kempf et al. |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |

(56) References Cited

U.S. PATENT DOCUMENTS

| | | |
|---|---|---|
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0140889 A1 | 5/2019 | Mayya et al. |
| 2019/0140890 A1 | 5/2019 | Mayya et al. |
| 2019/0158605 A1 | 5/2019 | Markuze et al. |

FOREIGN PATENT DOCUMENTS

| | | |
|---|---|---|
| WO | 2012167184 A2 | 12/2012 |
| WO | 2017083975 A1 | 5/2017 |
| WO | 2019070611 A1 | 4/2019 |
| WO | 2019094522 A1 | 5/2019 |

OTHER PUBLICATIONS

Non-Published commonly Owned U.S. Appl. No. 15/784,404, filed Oct. 16, 2017, 21 pages, Nicira, Inc.
Non-Published commonly Owned U.S. Appl. No. 15/838,052, filed Dec. 11, 2017, 28 pages, Nicira, Inc.
Non-Published commonly Owned U.S. Appl. No. 15/838,355, filed Dec. 12, 2017, 30 pages, Nicira, Inc.
Petition for Post-Grant Review of U.S. Pat. No. 9,722,815, filed May 1, 2018, 106 pages.
Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

\* cited by examiner

PER LINK BANDWIDTH ACCUMULATION:

$P$ = set of priorities = {High = 1, Normal = 2, Low = 3}

$S_n(P)$ = On the wire bandwidth per provider $n$ $D_n(P)$ = Dropped bandwidth per provider $n$ $U_n(P)$ = Usage Score per priority for Provider $n$ = $\sum_{P=1}^{3} \sum_{n=1}^{N} Sn(P) + Dn(P)$ $B(P)$ = Total required bandwidth per priority = $\sum_{P=1}^{3} \sum_{n=1}^{N} Un(P)$

NETWORK MULTI-SOURCE INBOUND QUALITY OF SERVICE METHODS AND SYSTEMS

CROSS-REFERENCE TO RELATED APPLICATIONS

This application claims priority to U.S. Provisional Application No. 62/457,816, titled METHOD AND SYSTEM OF OVERLAY FLOW CONTROL, filed on 11 Feb. 2017. This provisional application is incorporated by reference in its entirety.

FIELD OF THE INVENTION

This application relates generally to computer networking, and more specifically to a system article of manufacture and method Of Multi-Source Inbound QoS (quality of service).

DESCRIPTION OF THE RELATED ART

Employees working in branch offices of an Enterprises typically need to access resources that are located in another branch office. In some cases, these are located in the Enterprise Data Center, which is a central location for resources. Access to these resources is typically obtained by using a site-to-site VPN, which establishes a secure connection over a public network (e.g. the Internet, etc.). There may be dedicated computer equipment in the branch office, the other branch office and/or Data Center which establishes and maintains the secure connection. These types of site-to-site VPNs can be setup one at a time and can be resource intensive to set up and maintain.

It is typical in deployments that a VCMP endpoint (e.g. a receiver) (e.g. VCMP tunnel initiator or responder; can be a VCE or VCG) can receive traffic from multiple VCMP sources (e.g. providers henceforth), such as VCMP endpoints and/or a host in the Internet. In these scenarios, the sum of all the receiver traffic on the receiver can be greater than the rated receiver capacity on the link. This can be because the providers are independent of each other. The provider can also be agnostic of the total unused receiver capacity at the receiver. This can lead to receiver oversubscription at the receiver which may lead to adverse impact on application performance.

SUMMARY

A computerized method useful for implementing a Multi-Source Inbound QoS (Quality of Service) process in a computer network includes the step of calculating a current usage rate of a provider entity. The provider entity is classified by a network traffic priority; implementing a fair sharing policy among a set of provider entities. The method includes the step of adjusting any excess bandwidth among a set of provider entities. The method includes the step of implementing link sharing at a provider-entity level.

BRIEF DESCRIPTION OF THE DRAWINGS

FIG. 13 illustrates an example screenshot of an algorithm for calculating a usage score, according to some embodiments.

Figure 1:
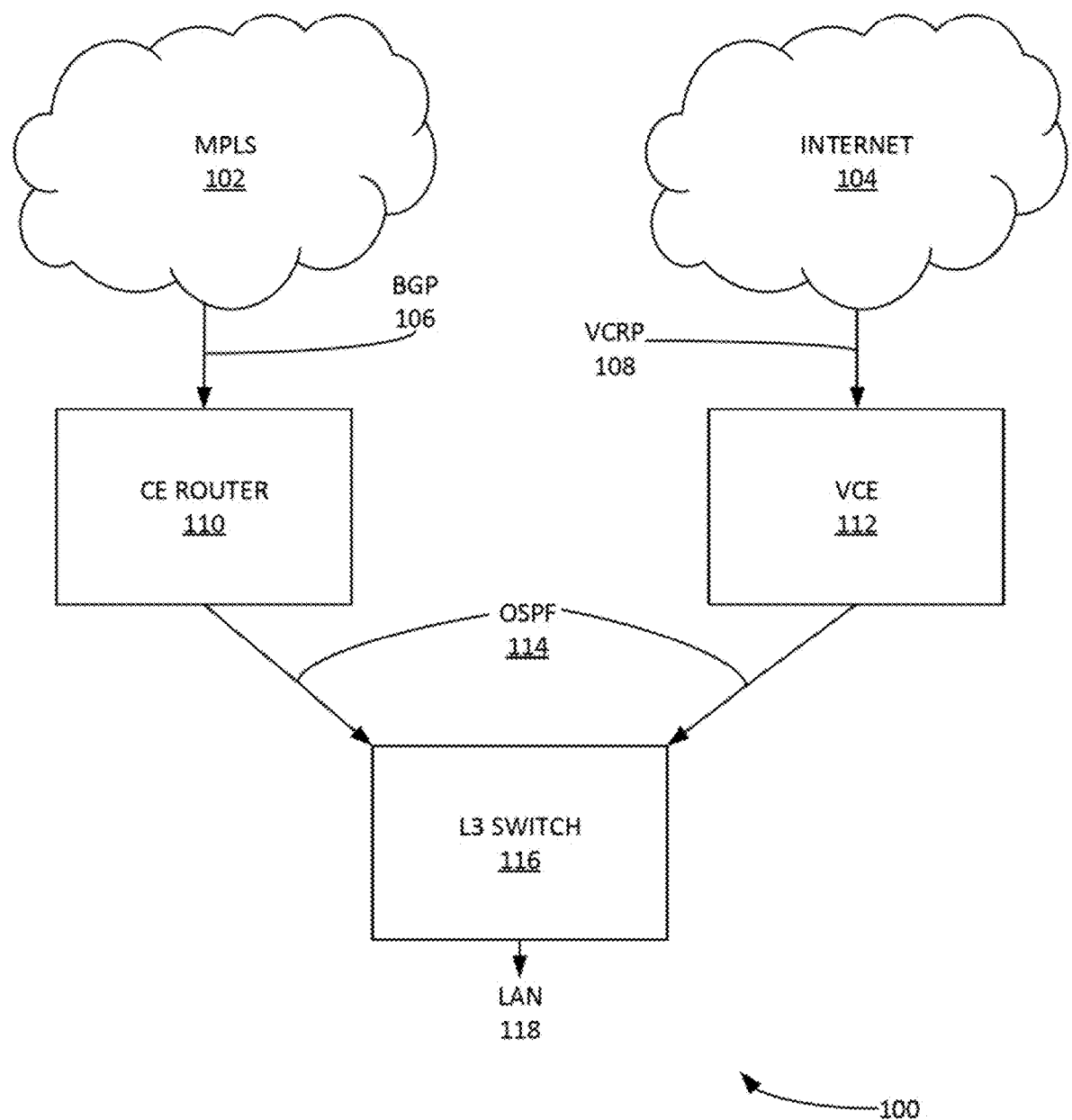
FIG. 1 illustrates an example net k for implementing Overlay Flow Control, according to some embodiments.

The Figures described above are a representative set, and are not exhaustive with respect to embodying the invention.

DESCRIPTION

Disclosed are a system, method, and article of manufacture for overlay flow control. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described, features, structures, or characteristics of the invention may be combined, in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a wafting or monitoring period of unspecified duration between enumerated steps of the depicted method. Additionally, the order in which a particular method occurs may or may not strictly adhere to the order of the corresponding steps shown.

Definitions

Example definitions or some embodiments are now provided.

Border Gateway Protocol (BGP) can be a standardized exterior gateway protocol designed to exchange routing and reachability information among autonomous systems (AS) on the Internet.

Cloud computing can involve deploying groups of remote servers and/or software networks that allow centralized data storage and online access to computer services or resources. These groups of remote serves and/or software networks can be a collection of remote computing services.

CE router (customer edge router) can be a router located on the customer premises that provides an Ethernet interface between the customer's LAN and the provider's core network. CE routers can be a component in an MPLS architecture.

Customer-premises equipment (CPE) can be any terminal and associated equipment located at a subscriber's premises and connected with a carrier's telecommunication channel at the demarcation point.

Edge device can be a device that provides an entry point into enterprise or service provider core networks. An edge device can be software running in a virtual machine (VM) located in a branch office and/or customer premises.

Firewall can be a network security system that monitors and controls the incoming and outgoing network traffic based on predetermined security rules.

Flow can be a grouping of packets that match a five (5) tuple which is a combination of Source IP Address (SIP), Destination IP Address (DIP), L4 Source Port (SPORT) and L4 Destination Port (DPORT) and the L4 protocol (PROTO).

Forward error correction (FEC) (e.g. channel coding) can be a technique used for controlling errors in data transmission over unreliable or noisy communication channels.

Deep learning can be a type of machine learning based on a set of algorithms that attempt to model high-level abstractions in data by using model architectures, with complex structures or otherwise, composed of multiple non-linear transformations Deep Packet Inspection (DPI) can be the ability to analyze the different layers of a packet on the network.

Gateway can be a node (e.g. a router) on a computer network that serves as an access point to another network.

Internet Protocol Security (IPsec) can be a protocol suite for securing Internet Protocol (IP) communications by authenticating and encrypting each IP packet of a communication session.

Multiprotocol Label Switching (MPLS) can be a mechanism in telecommunications networks that directs data from one network node to the next based on short path labels rather than long network addresses, thus avoiding complex lookups in a routing table.

Orchestrator can include a software component that provides multi-tenant and role based centralized configuration management and visibility.

Open Shortest Path First (OSPF) can be a routing protocol for Internet Protocol (IP) networks. OSPF ca use a link state routing (LSR) algorithm and falls into the group of interior gateway protocols (IGPs), operating within a single autonomous system (AS).

Quality of Service (QoS) can include the ability to define a guaranteed set of actions such as routing, resource constraints (e.g. bandwidth, latency etc.).

Software as a service (SaaS) can be a software licensing and delivery model in which software is licensed on a subscription basis and is centrally hosted.

Tunneling protocol can allow a network user to access or provide a network service that the underlying network does not support or provide directly.

Virtual Desktop Infrastructure (VDI) is a desktop-oriented service that hosts user desktop environments on remote servers and/or blade PCs. Users access the desktops over a network using a remote display protocol.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Voice over IP (VoIP) can a methodology and group of technologies for the delivery of voice communications and multimedia sessions over Internet Protocol (IP) networks, such as the Internet.

Additional example definitions are provided herein.

Examples Systems and Processes of Overlay Flow Control

In order to integrate into customer environments with minimal configuration required on existing devices, an Edge device and a gateway system can support dynamic routing protocols. In order to facilitate simplified use and management of these dynamic routing protocols such as OSPF. Accordingly, various Overlay Flow Control methods and system can be implemented. These can provide a user a single, simple point of configuration for all routes in a network without requiring changes to the protocol configuration itself.

FIG. 1 illustrates an example network 100 for implementing Overlay Flow Control, according to some embodiments. Network 100 provides an example topology with a single L3 switch 116 that is connected on the LAN 118 side of an edge device 112 (e.g. a VELOCLOUD® edge device, etc.). L3 switch 116 can also be connected to a CE router 110. CE router 110 can redistribute an MPLS 102 and/or BGP 106 routes into OSPF 114 routes. In this topology, the edge device can learn routes from the L3 switch 116. Edge device 112 can inject its own routes as well. Network 100 can be communicatively coupled with the Internet 104 utilizing routing protocol 108 (e.g. VELOCLOUD® routing protocol, etc.). CE router 110 can be a customer edge (CE) router.

Figure 2:
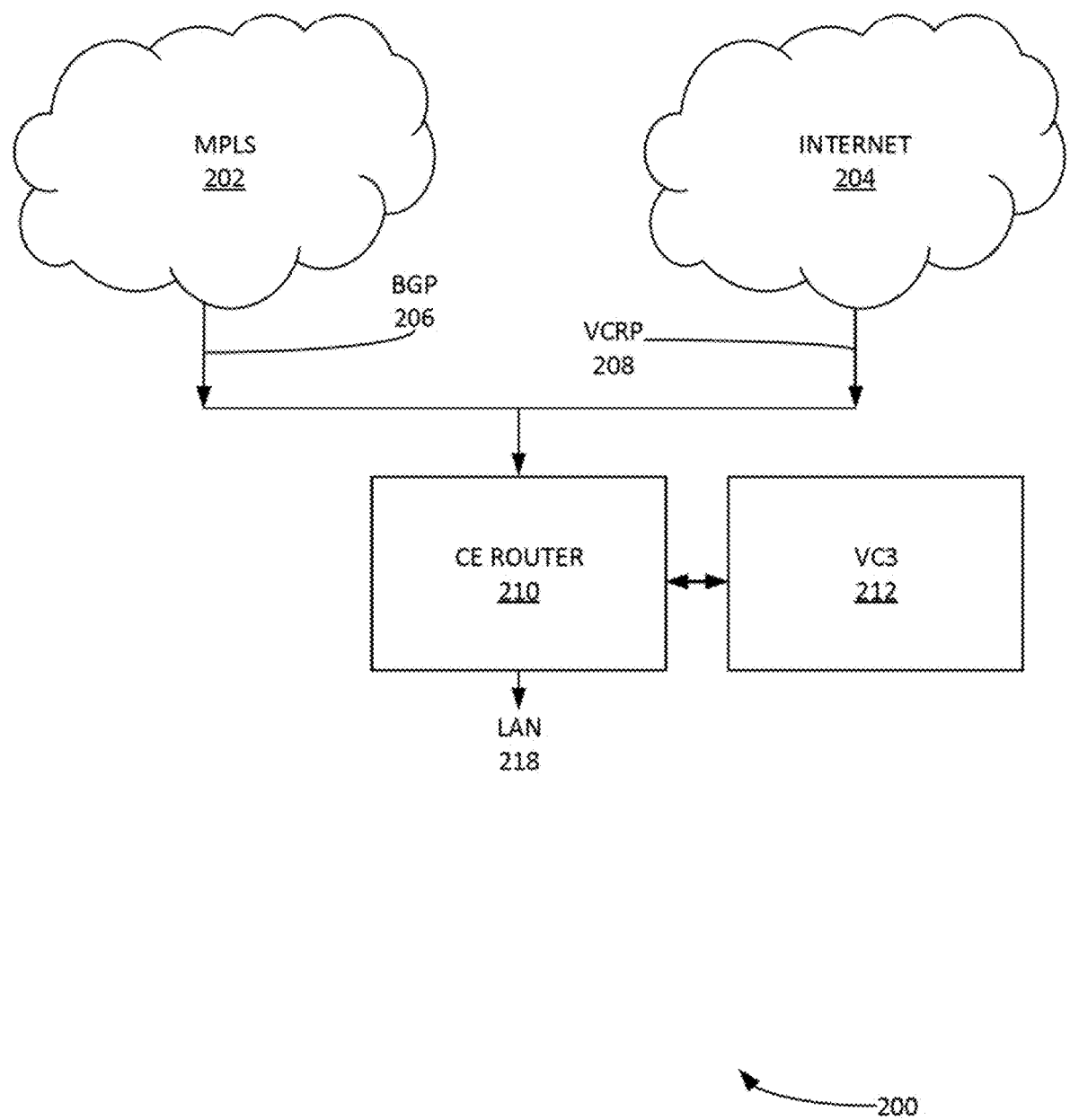
FIG. 2 illustrates another example network for implementing Overlay Flow Control, according to some embodiments.

FIG. 2 illustrates another example network 200 for implementing Overlay Flow Control, according to some embodiments. Network 100 provides an example topology where the Internet 204 and MPLS 202 links both terminate on a single router 210. Edge device 212 can be deployed in a 'one-arm' configuration attached to CE router 212. The edge device can redistribute an MPLS 102 and/or BGP 106 routes into OSPF 114 routes. In this topology, edge device 212 can learn routes from the L3 switch 116. In this example topology, edge device 212 can learn routes from the CE router 212, as well as injecting its own routes.

Figure 3:
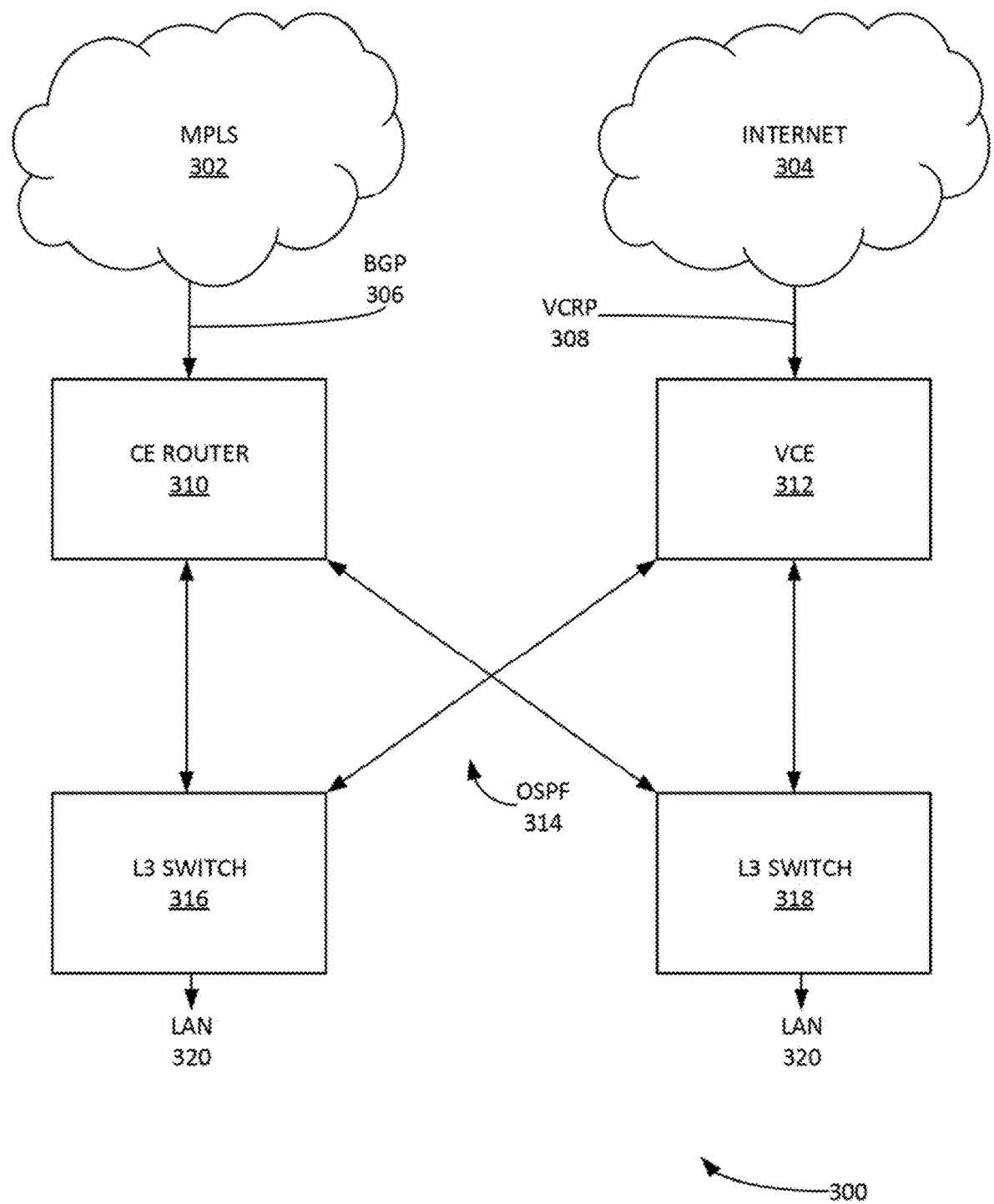
FIG. 3 illustrates another example network for implementing Overlay Flow Control, according to some embodiments.

FIG. 3 illustrates another example network 300 for implementing Overlay Flow Control, according to some embodiments. In an example large branch site, an active/active L3 switches 316-318 can communicate routes using OSPF 314 between two upstream devices (e.g. an Edge device) using OSPF 314 and a CE router 310. CE router 310 redistribute MPLS BGP routes 302, 306 into OSPF routes 314. It is noted that network 300 includes the notion of a single WAN link (e.g. MPLS) is accessible via two routed interfaces. In order to support this, a virtual IP address can be provisioned inside the edge and used in OSPF advertisement.

Figure 4:
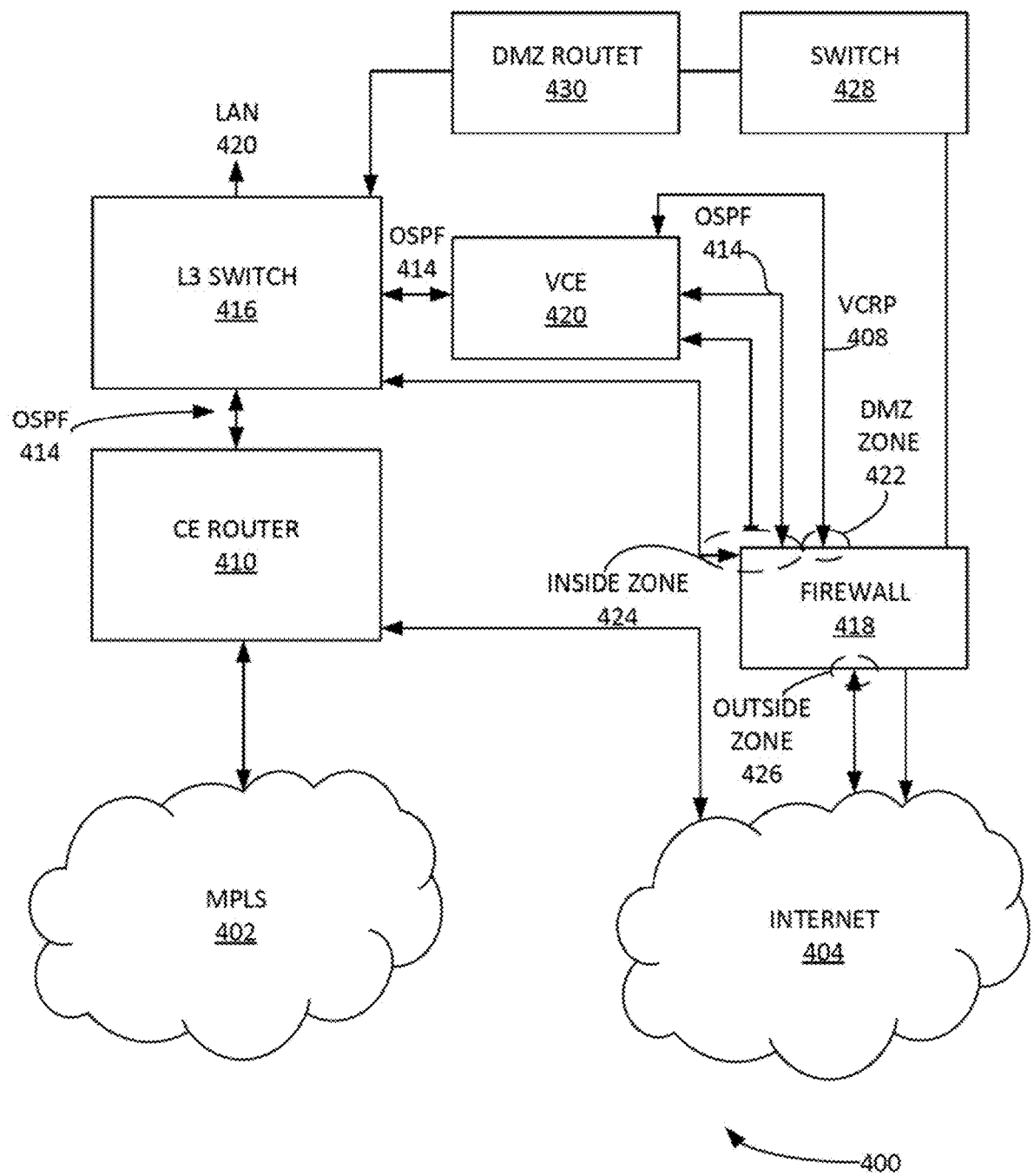
FIG. 4 illustrates another example network for implementing Overlay Flow Control, according to some embodiments.

FIG. 4 illustrates another example network 400 for implementing Overlay Flow Control, according to some embodiments. Network 400 can implement Overlay Flow Control in a datacenter site. A datacenter can have a distinct separation between the MPLS core and DMZ switch. The L3 switch can be talking OSPF and can be used for route learning and injection. The firewall within the DMZ can use routes injected via OSPF (though none may be learned) to ensure that returning Internet traffic is routed symmetrically.

Figure 5:
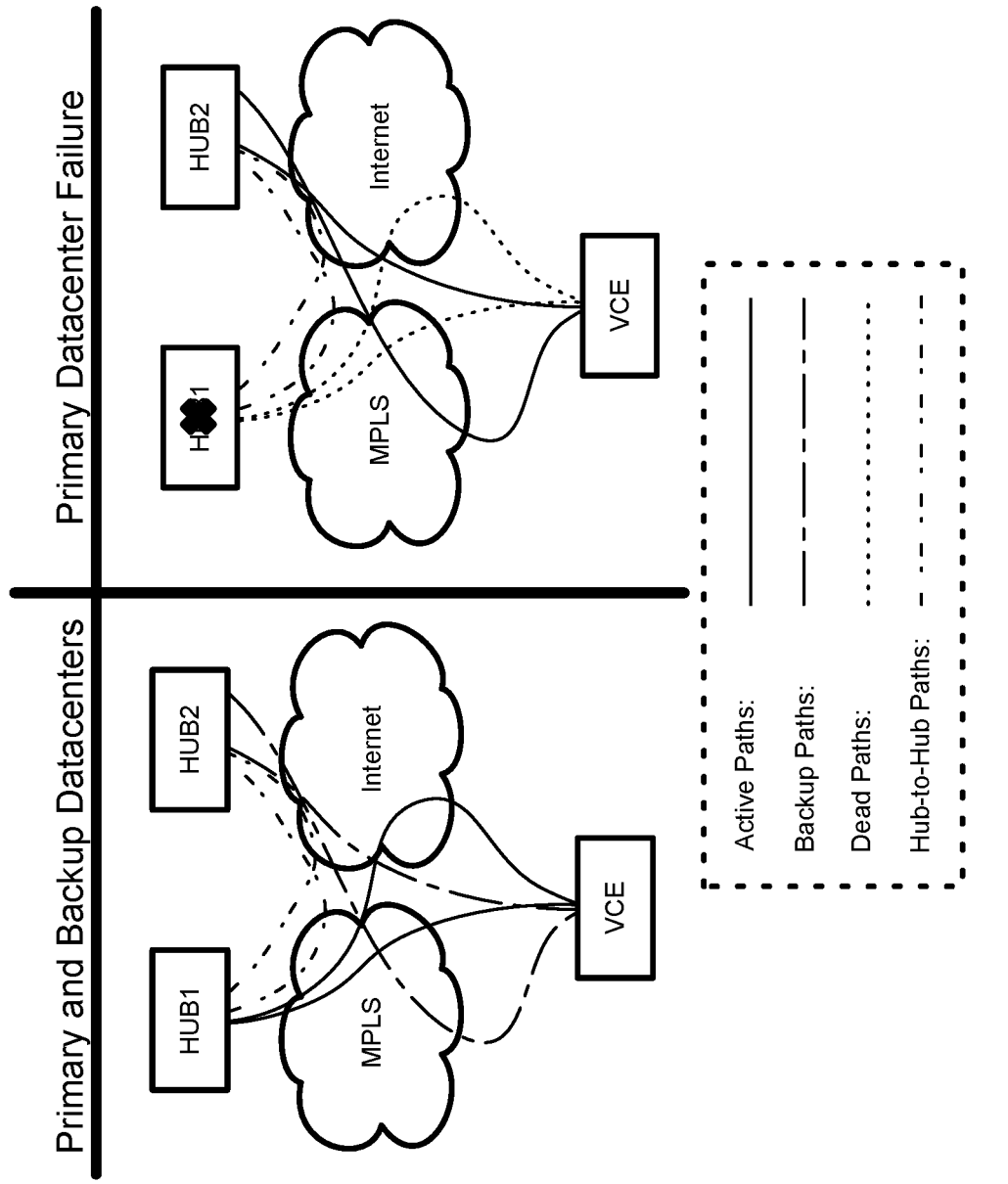
FIG. 5 illustrates an example topology of two datacenters can be configured as edge-to-edge VPN hubs, according to some embodiments.

FIG. 5 illustrates an example topology 500 of two datacenters can be configured as edge-to-edge VPN hubs, according to some embodiments. Example topology 500 can include redundant datacenters which advertise the same subnets with different costs. In this scenario, both datacenters (e.g. a primary datacenter and a backup datacenter, etc.) can be configured as edge-to-edge VPN hubs. As all edges connect directly to each hub, the hubs can also connect directly to each other. Based on a route cost value, network traffic can be steered to the preferred active datacenter.

The customer can indicate whether routes are preferred (e.g. VELOCLOUD® Overlay becomes the default path with MPLS as a backup) and/or non-preferred (e.g. where MPLS remains the default path with VELOCLOUD® Overlay as a backup). The route costs for preferred, non-preferred and/or default routes can be configurable. For example, they can have different defaults based on whether OE1 or OE2 routes are used in the redistribution.

In one example, a CE Router can advertise an OE2 route. For routes with cost 'n' (where 'n>1') it can be advertised with cost 'n−1'. For routes with cost '1', it can be advertised with cost '1' and a link cost 'm−1', where m is the link cost from the L3 Switch/Router to the CE router.

In another example, CE Router advertises an OE1 route. Take the OE1 route cost as 'n'. The link cost can be obtained from the L3 Switch/Router to the CE router as 'm'. It can be advertised a route with cost 'n-prime' and link cost 'm-prime' such that ('n-prime'+'m-prime')<('n+m').

Figure 6:
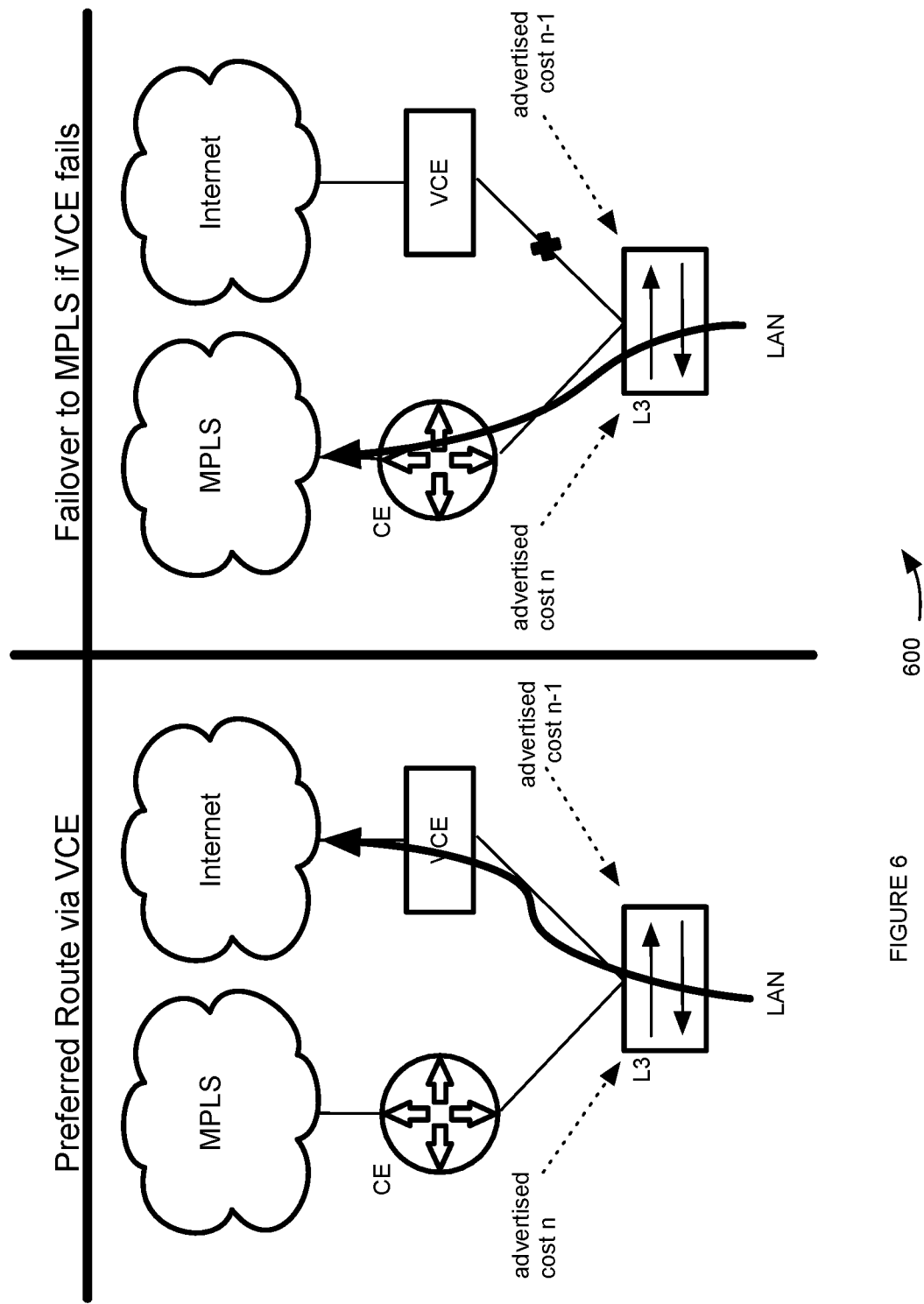
FIGS. 6-7 illustrates example failover behaviours for preferred and non-preferred routes, according to some embodiments.
Figure 7:
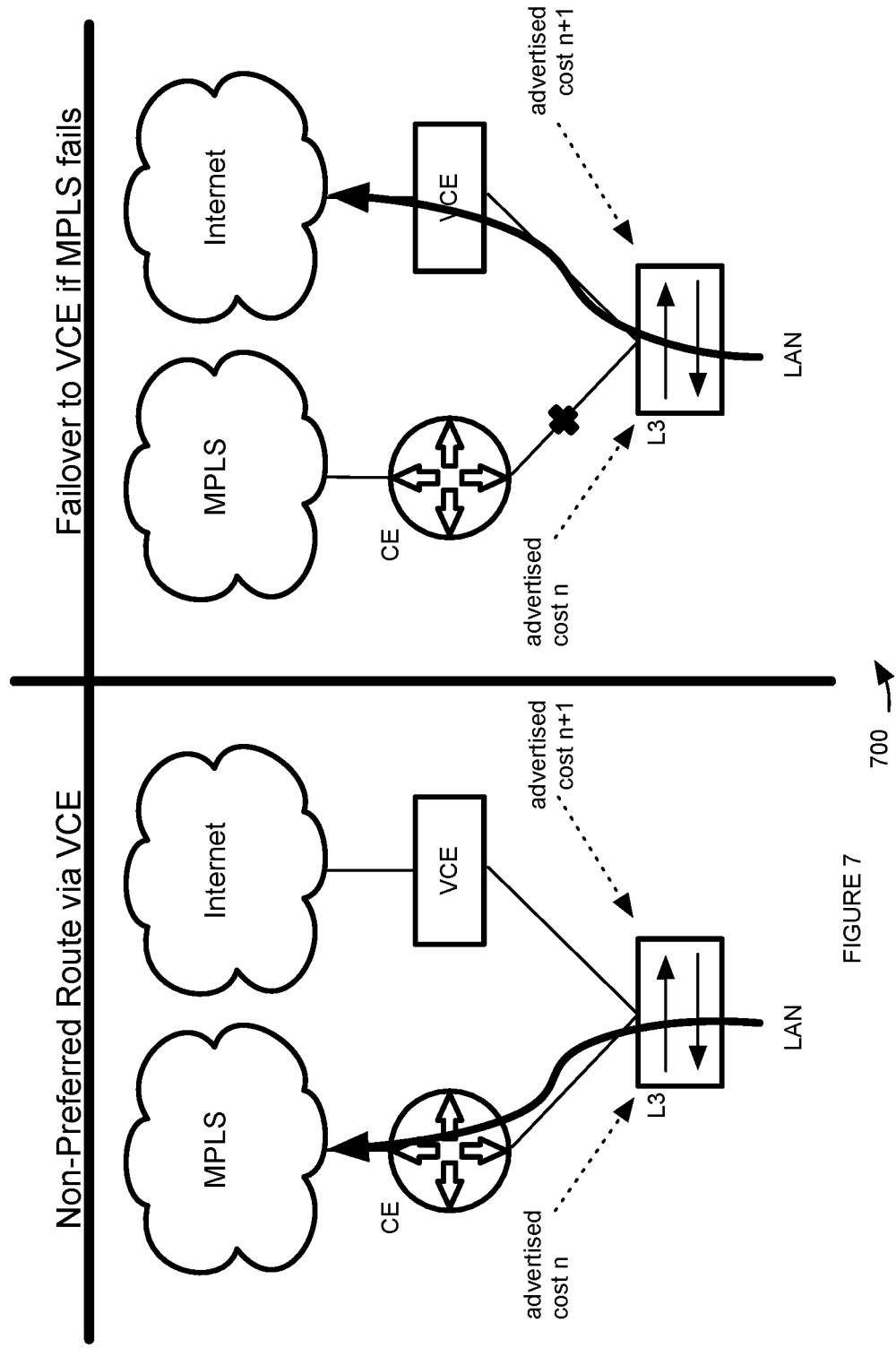

FIGS. 6-7 illustrates example failover behaviors 600-700 for preferred and non-preferred routes, according to some embodiments. It is noted that though route costs can be calculated for preferred and non-preferred routes (e.g. as provided supra), for simplicity they are presented below as 'n' for CE router cost, 'n−1' for a preferred route cost and 'n+1' for a non-preferred route cost.

To simplify the visualization and management of routes, they are presented in the Overlay Flow Control table. This table provides an enterprise-wide view of routes, routing adjacencies and preferred exits for each specific route. The preferred exit for any given route can be selected which can result in the routing preferences being automatically updated at each Edge device and advertised to influence routing changes across the network without the customer having to perform any further configuration actions. An edge device can implement the following rules for redistributing VCRP (e.g. a routing protocol) into OSPF. First, an edge device can redistribute VCRP prefixes that belong to various bronze sites as OE1, metric <m> if VCRP route preference is lower than DIRECT (if available) route preference. Else the prefixes are redistributed as OE2, metric <m> where m=low priority. A Direct route preference can be fixed to two-hundred and fifty-six (256). A VCRP route preference lower than 256 can indicate a route as a preferred route otherwise a Direct rout (if available) is preferred. The system can watch out for how CPE's redistribute this prefix into the MPLS cloud. The system can determine if the metric type is preserved by BGP attributes while redistributing into OSPF. The system can determine if the cost is preserved by BGP attributes while redistributing into OSPF.

Route insertion rules can be implemented. Routes can be inserted into a unified routing table based on the type of VPN profile configured. Hubs can setup direct routes for all VCRP prefixes. Branches can setup direct routes for prefixes via CG and/or VPN-hubs and/or DE2E direct route. For the same prefix, there can be two routes per transit point. This can be because the prefix is advertised by the owner and the hub. A first route can have a next_hop logical ID as transit point and destination logical ID as the owner. A next route can have a next hop logical ID and/or destination logical ID as VPN hub (e.g. not applicable for CG and DE2E).

A first example use case can include provisioning an edge device inside a datacenter location that previously did not contain one. In this example, Hub1 can be inserted into the Datacenter site as shown in the picture with a routed interface connected to L3 switch and the other WAN link connected to the Internet. The leg connecting L3 switch and Hub1 can have OSPF enabled. Hub1 can advertise default route 0.0.0.0/0 (originate-default) with metric 0 to L3 switch. This can allow Hub1 to take over Internet traffic sourced by subnets connected to L3 switch. Route H can have been learned as intra-area route (O). Route S can have been learned as external type route (e.g. OEx). Route H and Route S can be added to OSPF view and are sent to VCO for GNDT sync up. Hub1 can be marked as owner of prefix 'H' and VCO responds to Hub1 with advertise flag set to True for prefix 'H'. Sites that advertise intra-area (O) or inter-area (IA) routes can be marked as owner of the routes in GNDT and can be allowed to advertise the routes to VCG. VCO can respond to Hub1 with advertise flag set to False for prefix 'S' as 'S' is an external-route and requires administrator's intervention. Hub1 can advertises route 'H' to VCG through VCRP.

In a second use-case example, a Bronze site can be brought online. It is noted that the as a prerequisite, the Datacenter are already be online. A Bronze1 site (e.g. a simple branch office site with only Internet connections and no MPLS or dynamic routing protocols such as OSPF in use at the site) can be provisioned and connected to VCG through an Internet link. Bronze1 site can advertise route 'B' to VCG through VCRP. VCG can be a reflector that reflects route 'B' to Hub1 with Bronze1 site as next hop and can reflect route 'H' to Bronze1 site with Hub1 site as next hop.

In a third use-case example Silver site (e.g. a branch office site containing a hybrid of MPLS and internet WAN links as well as an L3 device which is learning and advertising routes via OSPF) can be brought online. It is noted that the as a prerequisite, the Datacenter and associated Bronze site are already be online. Silver1 site can be stood up and connected to VCG through an Internet link. Silver1 site can learn routes 'H' and 'B' through VCG and install the learned sites into a unified route table. For example, Silver1 site can learn routes 'S' as an intra-area and routes 'H' and 'B' as external routes (e.g. from L3 switch) Routes 'S', 'H', and 'B' can be added to OSPF View and are communicated to VCO for GNDT synchronization. VCO responds with advertise flag set to 'True' for prefix 'S' but set to False for prefix 'H' and 'B'. Silver1 can advertise 'S' to other branches via VCG over VCRP.

In a fourth use-case example, a Legacy site route advertisement can be implemented. It is noted that the as a prerequisite, the Datacenter and associated Bronze and Silver sites are already online. Legacy site route 'L' can be learned by Hub1 site and Silver1 site as external route (e.g. OEx). Hub1 and Silver1 can communicate route 'L' to VCO for GNDT synchronization. Hub1 can be chosen as owner for the external route 'L'. (e.g. without administrator intervention). Hub1 can advertise route 'L' to other branches via VCG over VCRP. This can enable connectivity between legacy site 'L' and bronze1 site 'B'.

Various examples of hybrid sites distributing routes learned through VCRP into OSPF are now discussed. In a first example, a hybrid site on receiving route 'R' over VCRP can redistribute 'R' to L3 switch as external route based on various criteria. VELOCLOUD® (B2B) can be set as preferred. Route 'R' can be revoked if it was installed with metric type OE2. Route 'R' can be redistributed with metric type OE1, metric 'M'=1; etc. Accordingly, the L3 switch can be programmed with route 'R' pointing to VCE. Additionally, OE1 can provide the adjacent routers to add cost to route 'R' as the routes get redistributed further and thus may not impact the route priority for this route 'R' on other receiving sites. In one example, Silver1 can install route 'R' with metric 1, metric type OE1. This route 'R' can be installed as the high priority route on adjacent L3 router(s). However, when this route 'R' reaches another hybrid site. For example, Datacenter site can see that the route 'R' with metric>one (1). Accordingly, this does not affect the route 'R' on adjacent L3 routers of Datacenter site that would be pointing to Datacenter site as next hop.

A Direct, criterion can be set as preferred when it is available. In one example, route 'R' can be revoked if it was installed with metric type OE1, metric 'M'=one (1). Route 'R' can be redistributed with metric type OE2, metric 'M'=cost of 'R'+<low_prio_offset>. <low_prio_offset> can be some value that installs the route as low priority route. The value can be updated based on lab experiment.

Hybrid site redistributing 'R' to L3 switch can enable connectivity between 'R' and 'B' over VELOCLOUD® B2B overlay. The VELOCLOUD B2B Overlay is the VELOCLOUD Edge and Gateway multipath system that was defined in the original patent providing multipath VPN connectivity between sites. Additionally, it allows connectivity between legacy sites 'L' and 'B' over private links and VELOCLOUD B2B overlay.

It should be noted that though OSPF has been used for illustration purposes supra, the overlay flow control table supports other dynamic routing protocols, for instance, if the protocol is BGP instead of OSPF, metric 'M' can be automatically calculated using MED or local preference.

Multi-Source Inbound QoS

Figure 8:
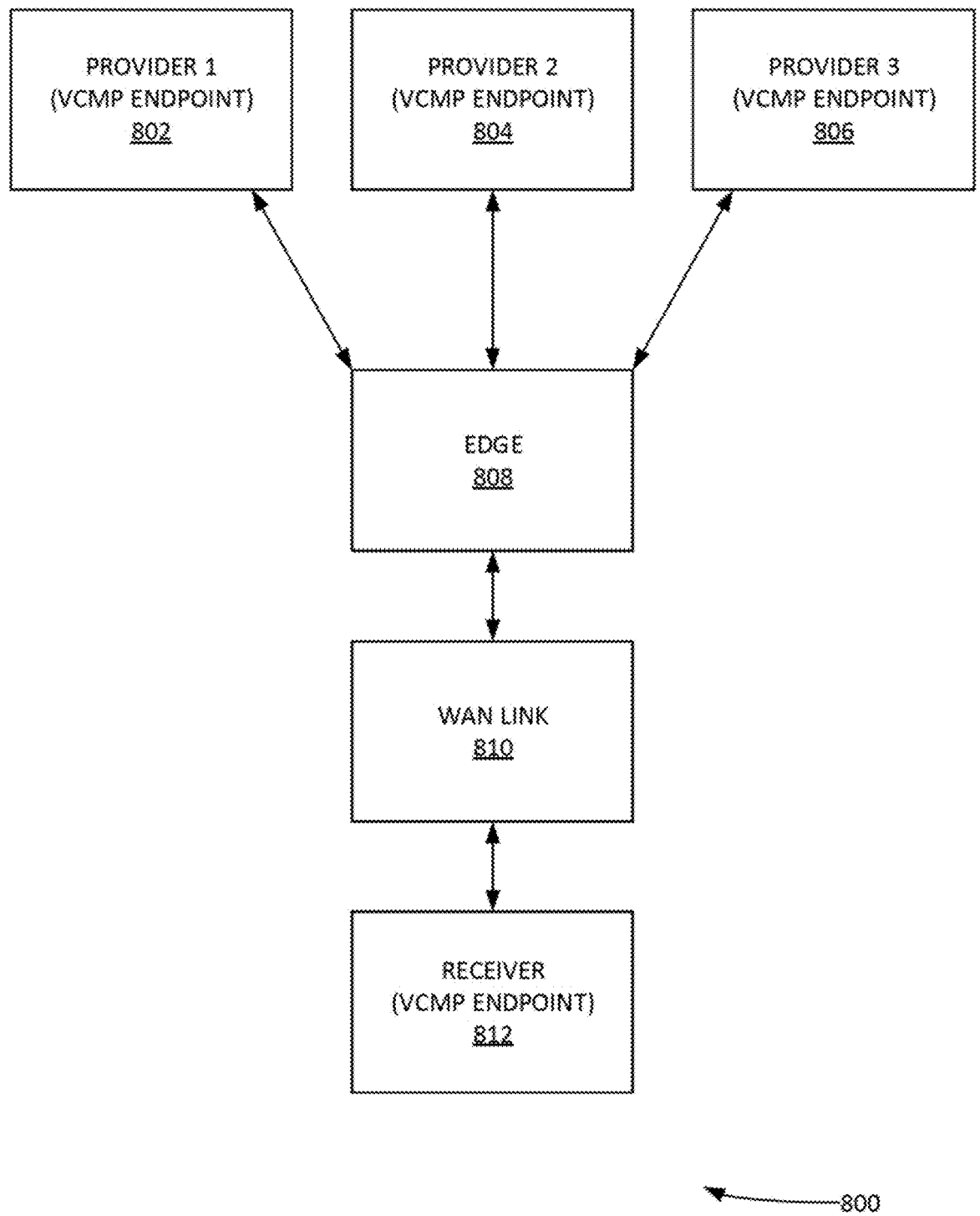
FIG. 8 illustrates an example system for implementing Multi-Source Inbound QoS (Quality of Service), according to some embodiments.

FIG. 8 illustrates an example system 800 for implementing Multi-Source Inbound QoS (Quality of Service), according to some embodiments. In system 800, the total receiver capacity of the WAN link 810 at the receiver can be ten (10) Mbps. Provider 1 802 and Provider 2 804 can be VCMP (VELOCLOUD Multipath Protocol) endpoints. Provider 3 806 can be a host on the internet. In the present example, Provider 1 802 can attempt to transmit 10 Mbps to the Edge 808. Provider 2 804 cart attempt to transmit 10 Mbps to the Edge 808. Provider 3 806 can attempt to transmit 10 Mbps to the Edge 808. Edge 808 can only accept 10 Mbps of the traffic but the aggregated receiver traffic from the providers 802-806 is greater than 10 Mbps leading to application degradation and general link quality degradation.

It is further noted that a provider's QoS class-based queueing may not be honoured at the receiver. For example, Provider 1 802 can be sending 'High' priority 'Realtime' class traffic and Provider 2 804 can be sending 'Low' priority 'Bulk' traffic. However, there is no guarantee that the High/Realtime traffic may be prioritized over the Low/Bulk traffic.

Multi-Source Inbound QoS is now discussed. Multi-source Inbound QoS addresses the problems discussed supra by letting the receiver assess the volume and priority of the receiver traffic and then assign the transmission bandwidth to the providers 802-806.

Figure 9:
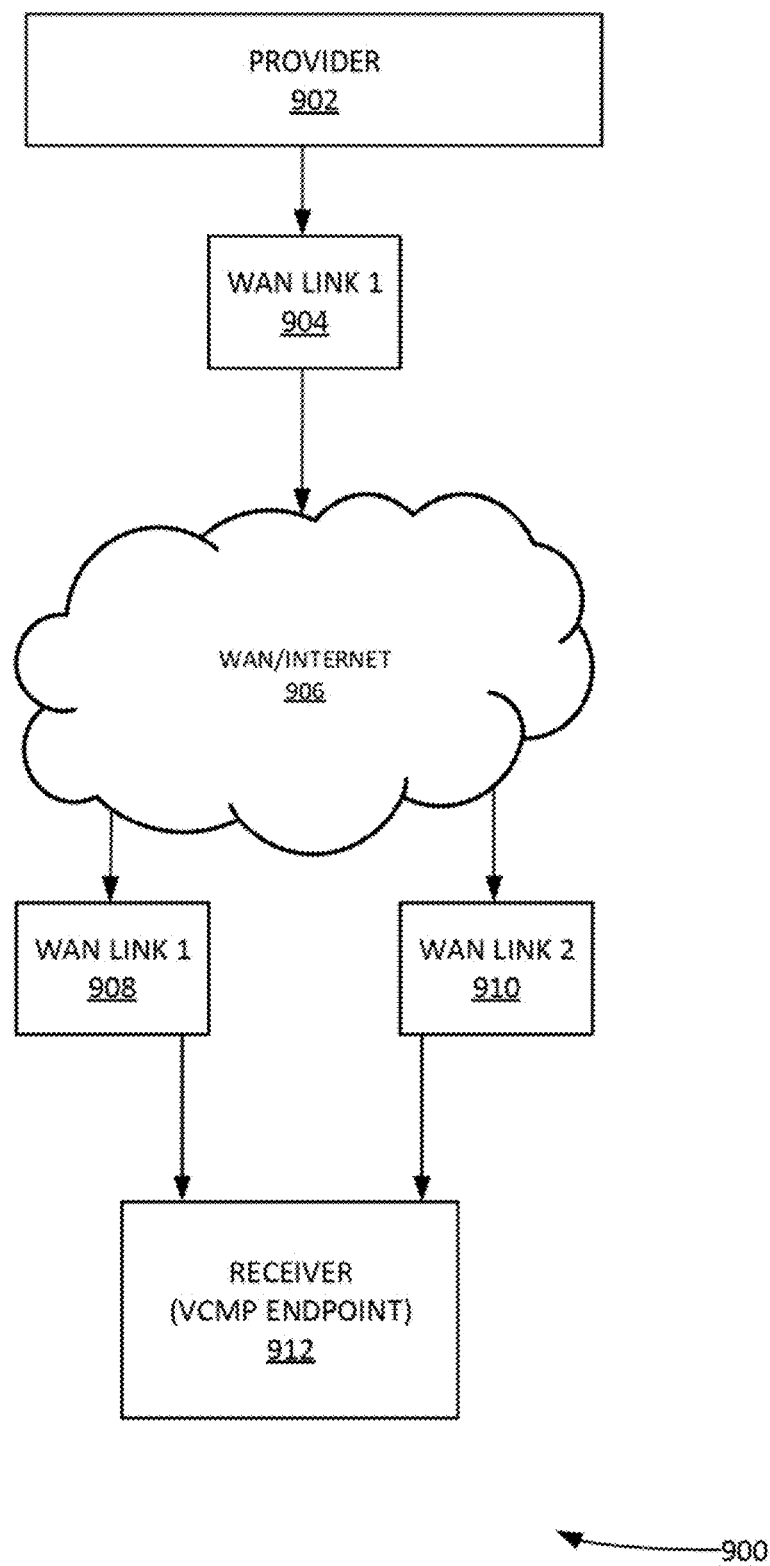
FIG. 9 illustrates a system with a many-to-one link on a provider (e.g. Cloud Gateways and one arm Partner Gateways), according to some embodiments.
Figure 10:
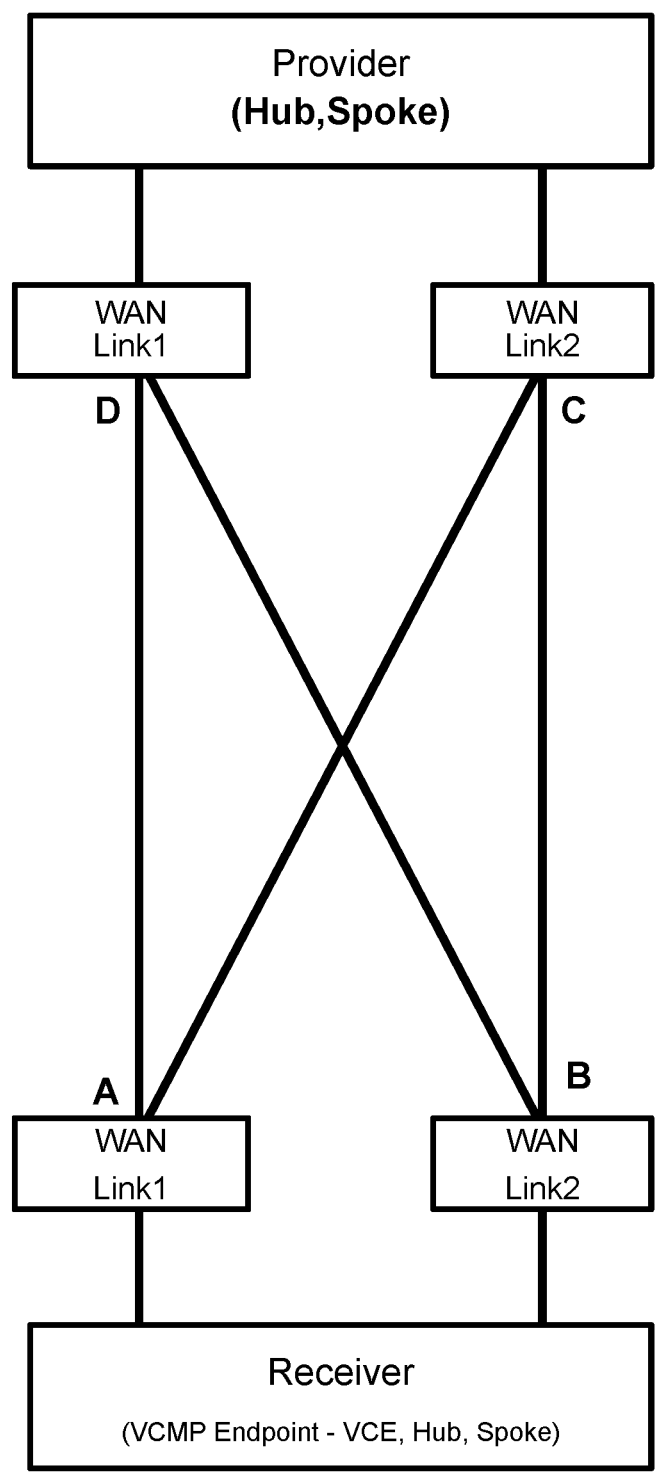
FIG. 10 illustrates a system with many-to-many links on the provider (e.g. with a hub as a provider).
Figure 11:
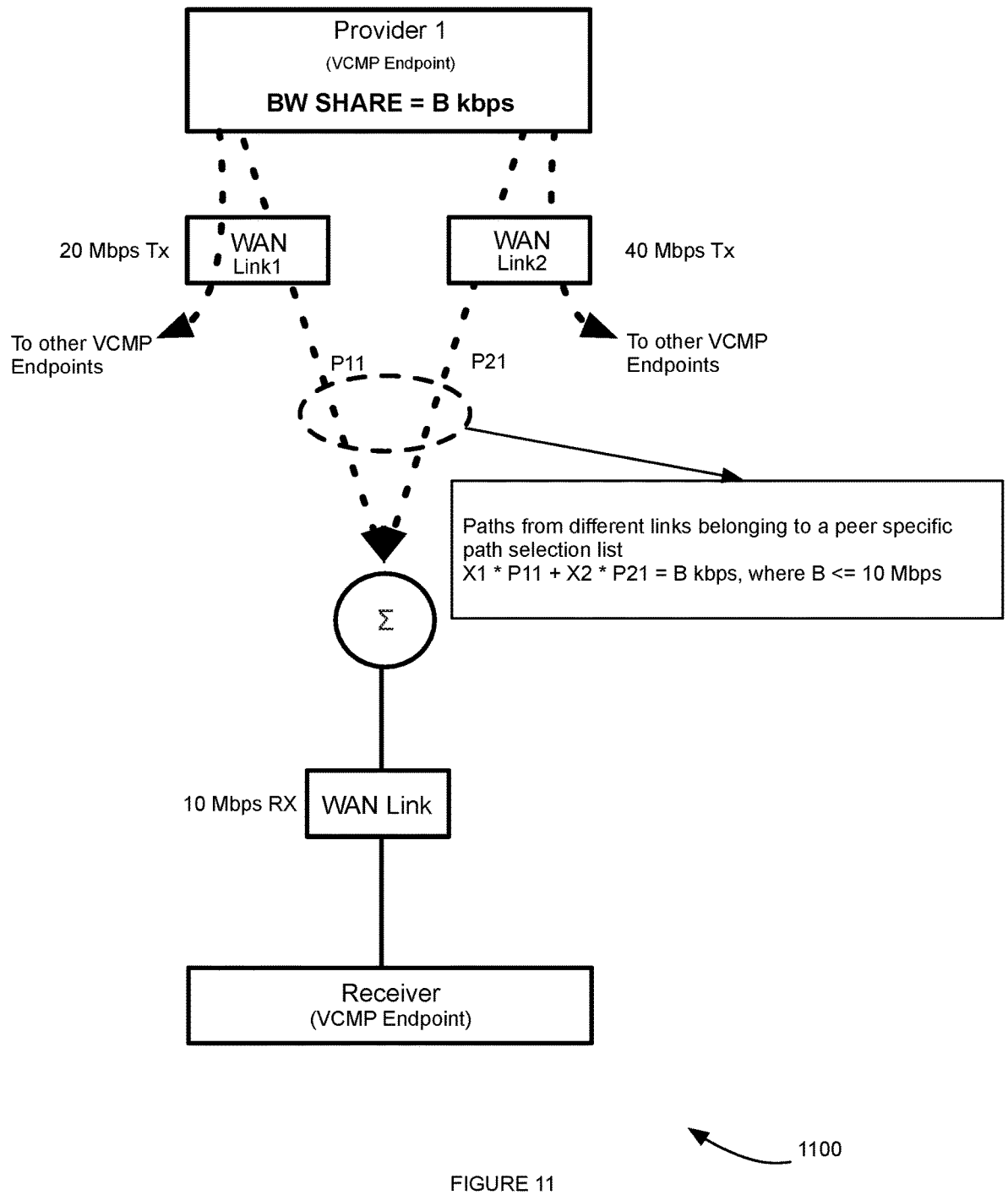
FIG. 11 illustrates an example system with endpoints as Hubs, according to some embodiments.

Various example topologies for implementing Multi-Source Inbound QoS are now provided. In some example, two classes of topologies can provide a unique in the way a provider 'shares' the allocated bandwidth. The topologies may differ in the number of links on which a VCMP paths can be terminated on a provider which in turn changes the link scheduling hierarchy and the caps that are configured at the nodes. FIGS. 9-11 illustrate example versions of this topology. FIG. 9 illustrates a system 900 with a many-to-one link on a provider (e.g. Cloud Gateways and one arm Partner Gateways), according to some embodiments. System 900 can include paths from receivers. FIG. 10 illustrates a system 1000 with many-to-many links on the provider (e.g. with a hub as a provider). System 1000 can include paths from receivers.

FIG. 11 illustrates an example system 1100 with endpoints as Hubs, according to some embodiments. It is noted that supported topologies can enable for VCMP tunnels on multiple links. In these case, this allocated share can be adjusted across paths without affecting multi-path link selection for that receiver. For Internet hosts as providers, a policer can be implemented at the receiver that can force the host to reduce its transmission rate to the capacity allocated for such providers.

Additional Exemplary Computer Architecture and Systems

Figure 14:
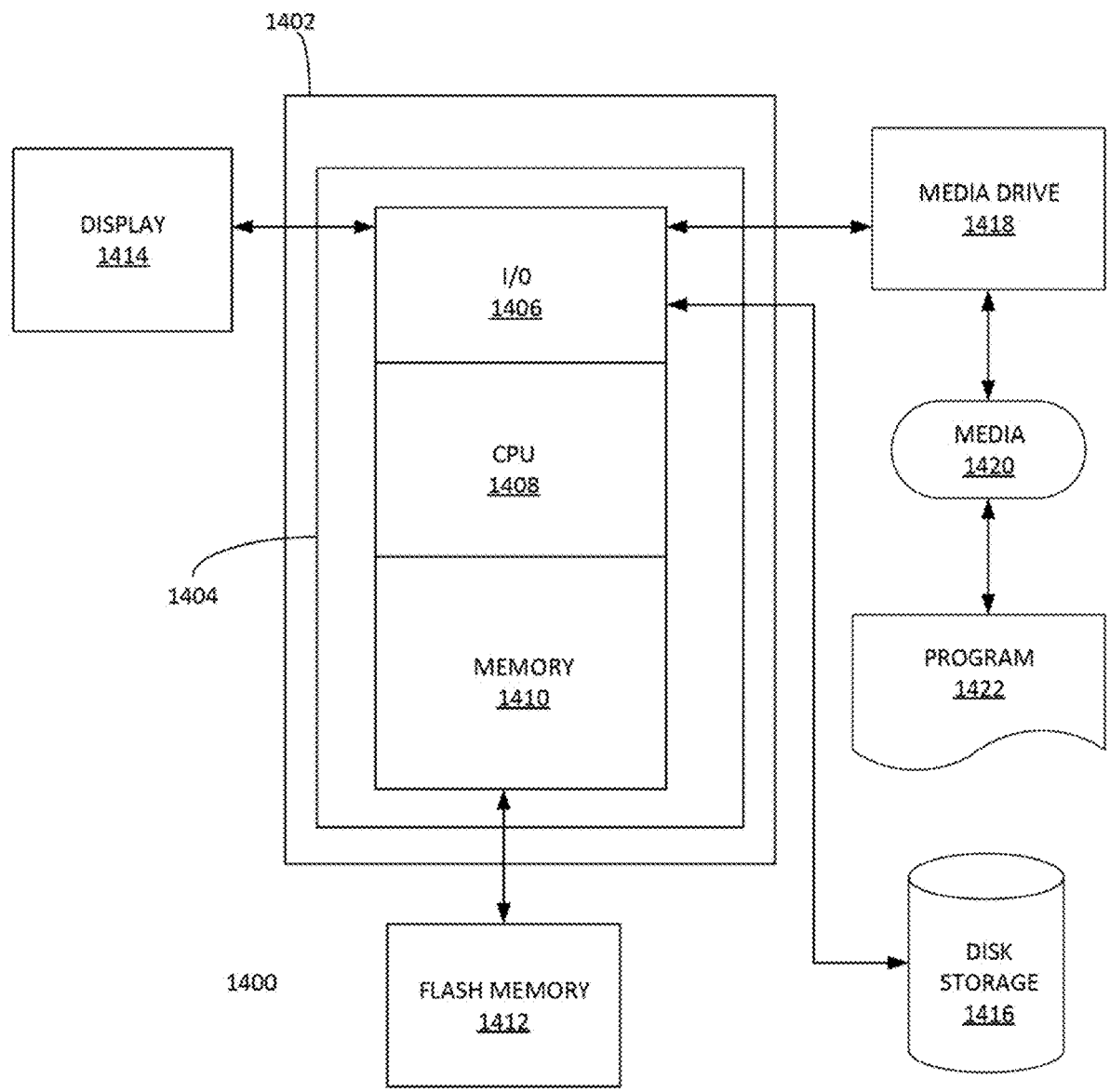
FIG. 14 depicts an exemplary computing system that can be configured to perform any one of the processes provided herein.

FIG. 14 depicts an exemplary computing system 1400 that can be configured to perform any one of the processes provided herein. In this context, computing system 1400 may include, for example, a processor, memory, storage, and I/O devices (e.g., monitor, keyboard, disk drive, Internet connection, etc.). However, computing system 1400 may include circuitry or other specialized hardware for carrying out some or al aspects of the processes. In some operational settings, computing system 1400 may be configured as a system that includes one or more units, each of which is configured to carry out some aspects of the processes either in software, hardware, or some combination thereof.

FIG. 14 depicts computing system 1400 with a number of components that may be used to perform any of the processes described herein. The main system 1402 includes a motherboard 1404 having an I/O section 1406, one or more central processing units (CPU) 1408, and a memory section 1410, which may have a flash memory card 1412 related to it. The I/O section 1406 can be connected to a display 1414, a keyboard and/or other user input (not shown), a disk storage unit 1416, and a media drive unit 1418. The media drive unit 1418 can read/write a computer-readable medium 1420, which can contain programs 1422 and/or data. Computing system 1400 can include a web browser. Moreover, it is noted that computing system 1400 can be configured to include additional systems in order to fulfill various functionalities. Computing system 1400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Multi-Source Inbound QoS

Figure 12:
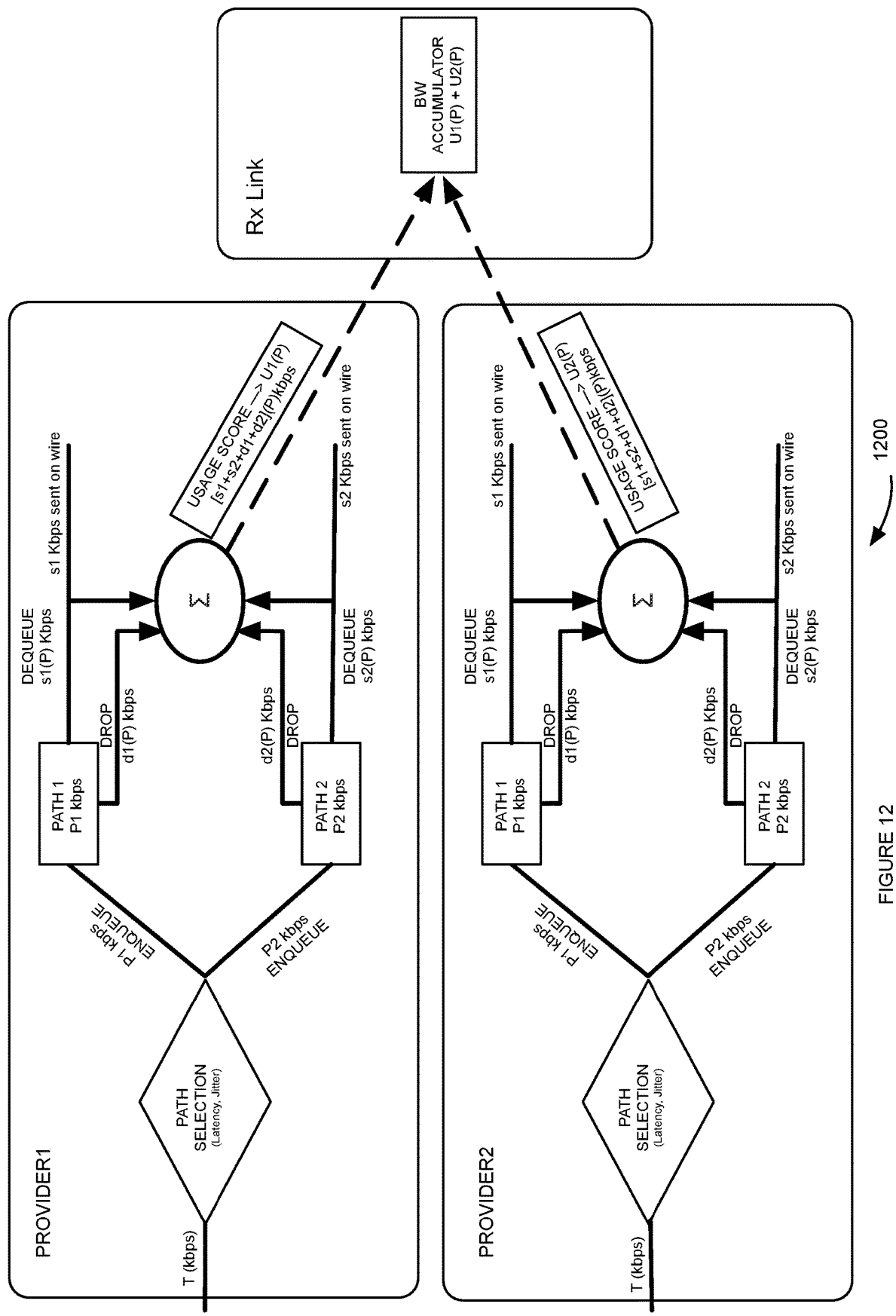
FIG. 12 illustrates an example process for calculating usage, according to some embodiments.
Figure 15:
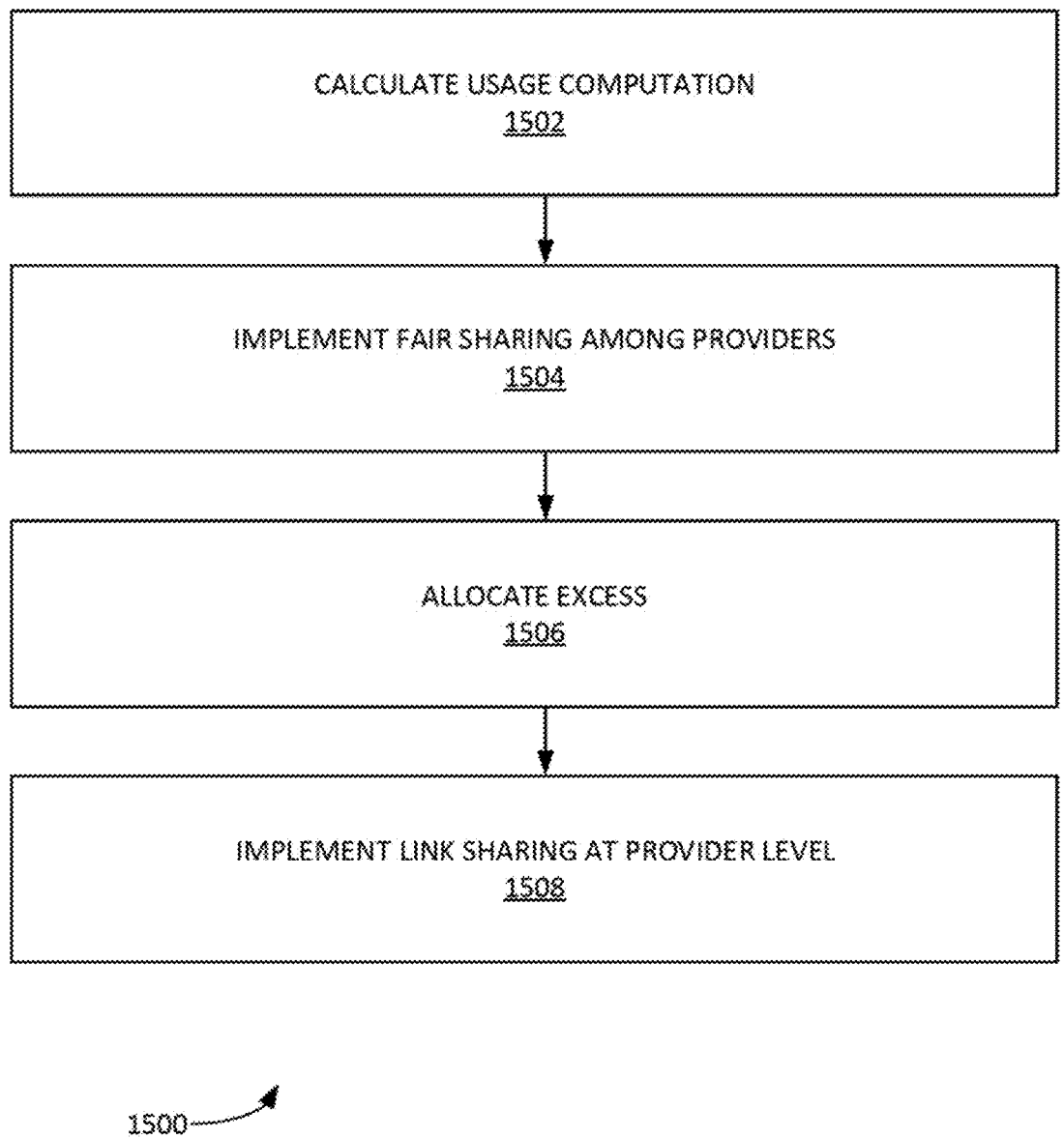
FIG. 15 illustrates an example Multi-Source Inbound QoS algorithm, according to some embodiments.

FIG. 15 illustrates n example Multi-Source Inbound QoS algorithm 1500, according to sortie embodiments. In step 1502, process 1500 can calculate usage computation. For example, step 1502 can calculate current usage rates of providers classified by traffic priority. FIG. 12 illustrates an example process 1200 for calculating usage, according to some embodiments. Each VELOCLOUD Endpoint in the VELOCLOUD Network can calculate a score for each of the high, normal and low priority traffic to be transmitted to the receiver. The usage score can account for traffic that is sent on the wire and also traffic that is dropped because of lack of capacity on that link. This usage score can be the total requirement for the provider to send traffic to the receiver without dropping any packets. This usage score can be communicated to the receiver which stores this in a bandwidth accumulator. The receiver can now use the sum of the scores, that were received from its peers, stored in the bandwidth accumulator, to determine the bandwidth needs of each peer on a per priority basis, and to distribute bandwidth fairly between all peers. FIG. 13 illustrates an example screenshot of an algorithm for calculating a usage score, according to some embodiments. Upon receipt of this information from all peers, the receiving edge, the bandwidth accumulator can calculate a total score for each priority which is a summation of the individual scores for a given priority.

In step 1504, process 1500 can implement fair sharing among providers (e.g. providers 802-806, etc.). For example, step 1504 can, allocate bandwidth to providers based, on the traffic priority and provider share ratios.

An example of allocating bandwidth to providers is now discussed. For example, the score that was communicated from a provider can be considered to be the bandwidth required for a given priority. This is because process 1500 measures the received and dropped Kbps, thus the sum of these is the amount of bandwidth that would be used to eliminate drops at the current traffic rate. The total bandwidth to be used can be considered to be the sum of all the required bandwidths per priority. If the total bandwidth to be used is less than the total link bandwidth, then it can be allocated to the provider in toto. If the total bandwidth to be used is greater than the total link bandwidth, then for each priority we assign the minimum of the bandwidth required or the total link bandwidth divided by the number of peers.

In step 1506, process 1500 can allocate excess. For example, step 1506 can adjust excess bandwidth, if any, amongst providers. For example, process 1500 can iterate through each peer and assign any leftover bandwidth to the first peer that we find which still requires more bandwidth.)

In step 1508, process 1500 can implement link sharing at provider level. For example, process 1508 can share the allocated bandwidth by configuring the link scheduler at the provider when appropriate in such a way that path selection policies are honored.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense, some embodiments, the machine-readable medium can be a non-transitory form of machine-readable medium.

What is claimed as new and desired to be protected by Letters Patent of the United States is:

1. A method for implementing a multi-source inbound QoS (Quality of Service) process for use on network traffic transmitted from a set of provider entities to a particular receiver entity in a computer network, wherein each of the provider entities in the set of provider entities shares at least one link with the particular receiver entity, the method comprising:
at the particular receiver entity,
receiving, from each provider entity in the set of provider entities, at least one usage score based on a quantity of network traffic transmitted by the provider entity to the receiver entity, wherein the particular receiver entity receives from a particular provider entity (i) a first usage score that relates to a quantity of network traffic transmitted by the particular provider entity at a first priority level and (ii) a second usage score that relates to a quantity of network traffic transmitted by the particular provider entity at a second priority level that is different from the first priority level;
storing the received usage scores in a bandwidth accumulator;
based on the stored usage scores, calculating a current usage rate for each provider entity in the set of provider entities in order to determine bandwidth needs for each provider entity; and
allocating bandwidth for the priority levels to each provider entity of the set of provider entities based on the determined bandwidth needs.

2. The method of claim 1, wherein the at least one usage score received from each provider entity in the set of provider entities comprises a total requirement for the provider entity to send computer network traffic to the particular receiver entity without dropping any data packets.

3. The method of claim 1, wherein the calculated current usage rate of each provider entity in the set of provider entities comprises a sum of all received usage scores stored in the bandwidth accumulator from any particular provider entity.

4. The method of claim 1 further comprising implementing a provider-entity-level link-sharing policy for each provider entity in the set of provider entities by configuring a link scheduler at each provider entity such that path selection policies are honored.

5. The method of claim 1, wherein network traffic is transmitted at one of a high-priority level, a normal-priority level, and a low-priority level.

6. The method of claim 5 further comprising calculating a usage score for each network traffic priority level, wherein the usage score for a particular network traffic priority level is the sum of all received usage scores at the particular network traffic priority level.

7. The method of claim 1 further comprising:
when the determined bandwidth needs for a particular provider entity are less than a total link bandwidth specified for the receiver entity, allocating the total determined amount of needed bandwidth to the particular provider entity; and
when the determined bandwidth needs for the particular provider entity are greater than a total link bandwidth specified for the receiver entity, allocating, for each network traffic priority level, a minimum required bandwidth to the particular provider entity.

8. The method of claim 1 further comprising computing a minimum required bandwidth for a provider entity by dividing the total link bandwidth specified for the receiver entity by a number of provider entities in the set of provider entities.

9. The method of claim 1, wherein each provider entity in the set of provider entities comprises any one of (i) a multipath protocol endpoint, (ii) an Internet host, and (iii) a multipath hub in an enterprise datacenter.

10. The method of claim 1 further comprising when excess bandwidth is found after allocating bandwidth for the priority levels to each provider entity of the set of provider entities, allocating the excess bandwidth among the set of provider entities.

11. The method of claim 10, wherein allocating the excess bandwidth among the set of provider entities comprises:
iterating through each provider entity and assigning the excess bandwidth to a first provider entity that still requires more bandwidth.

12. A computer system comprising:
a set of one or more processing units; and
a non-transitory machine readable medium storing a program which when executed by at least one of the processing units, implements a multi-source inbound Quality of Service (QoS) process for use on network traffic transmitted from a set of provider entities to a particular receiver entity in a computer network, wherein each of the provider entities in the set of provider entities shares at least one link with the particular receiver entity, the program comprising a set of instructions for:
at the particular receiver entity:
receiving, from each provider entity in the set of provider entities, at least one usage score based on a quantity of network traffic transmitted by the provider entity to the receiver entity, wherein the particular receiver entity receives from a particular provider entity (i) a first usage score that relates to a quantity of network traffic transmitted by the particular provider entity at a first priority level and (ii) a second usage score that relates to a quantity of network traffic transmitted by the particular provider entity at a second priority level that is different from the first priority level;
storing the received usage scores in a bandwidth accumulator;
based on the stored usage scores, calculating a current usage rate for each provider entity in the set of provider entities in order to determine bandwidth needs for each provider entity;
allocating bandwidth for the priority levels to each provider entity of the set of provider entities based on the determined bandwidth needs.

13. The computerized system of claim 12, wherein the at least one usage score received from each provider entity in the set of provider entities comprises a total requirement for the provider entity to send computer network traffic to the particular receiver entity without dropping any data packets.

14. The computerized system of claim 12, wherein the calculated current usage rate of each provider entity in the set of provider entities comprises a sum of all received usage scores stored in the bandwidth accumulator from any particular provider entity.

15. The computerized system of claim 12, wherein the program comprises a set of instructions for implementing a provider-entity-level link-sharing policy for each provider entity in the set of provider entities by configuring a link scheduler at each provider entity such that path selection policies are honored.

16. The computerized system of claim 12, wherein each provider entity in the set of provider entities comprises any one of (i) a multipath protocol endpoint, (ii) an Internet host, and (iii) a multipath hub in an enterprise datacenter.

* * * * *